United States Patent
Hartmann et al.

(10) Patent No.: US 9,018,810 B2
(45) Date of Patent: Apr. 28, 2015

(54) STATOR FOR AN EC-MOTOR AND EC-MOTOR WITH SUCH A STATOR

(75) Inventors: Holger Hartmann, Mulfingen (DE); Gerd Futterlieb, Obersontheim (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 135 days.

(21) Appl. No.: 13/492,017

(22) Filed: Jun. 8, 2012

(65) Prior Publication Data
US 2012/0313462 A1 Dec. 13, 2012

(30) Foreign Application Priority Data
Jun. 10, 2011 (EP) .................................. 11169438

(51) Int. Cl.
| | | |
|---|---|---|
| *H02K 1/04* | (2006.01) | |
| *H02K 11/00* | (2006.01) | |
| *H02P 29/00* | (2006.01) | |
| *H02H 6/00* | (2006.01) | |
| *H02P 25/02* | (2006.01) | |
| *H02H 7/085* | (2006.01) | |
| *H02K 5/08* | (2006.01) | |

(52) U.S. Cl.
CPC ........ *H02K 11/0047* (2013.01); *H02P 29/0055* (2013.01); *H02H 6/00* (2013.01); *H02H 7/0852* (2013.01); *H02K 5/08* (2013.01); *H02P 25/026* (2013.01); *H02K 11/0073* (2013.01)

(58) Field of Classification Search
USPC .................................. 310/43, 89, 68 C, 44, 45
See application file for complete search history.

(56) References Cited

U.S. PATENT DOCUMENTS

| 6,081,056 A * | 6/2000 | Takagi et al. ..................... 310/89 |
| 7,633,197 B2 * | 12/2009 | Isoda et al. ..................... 310/68 C |
| 8,188,627 B2 * | 5/2012 | Yang et al. ..................... 310/68 C |
| 2008/0018181 A1 * | 1/2008 | Neal ................................. 310/54 |
| 2010/0270873 A1 * | 10/2010 | Sagara et al. ..................... 310/43 |

FOREIGN PATENT DOCUMENTS

| DE | 199 48 396 | | 5/2001 | |
| DE | 10 2007 040423 | | 2/2009 | |
| EP | 2 239 832 | | 10/2010 | |
| EP | 2239832 A1 * | 10/2013 | |
| JP | 318246 | * | 1/1991 | |
| JP | 03022847 A * | 1/1991 | ............. H02K 11/00 |
| JP | 2008 022679 | | 1/2008 | |

* cited by examiner

*Primary Examiner* — Dang Le
*Assistant Examiner* — Leda Pham
(74) *Attorney, Agent, or Firm* — Brinks Gilson & Lione

(57) ABSTRACT

A stator for a brushless, electronically commutated electric motor having a stator core wound with stator windings and control electronics for controlling the stator windings. The stator core together with the stator windings are enclosed in a molded encapsulation made of a plastic material of a defined thermal conductivity ($\lambda$St). The temperature sensor is arranged on the outside at the encapsulation, and the control electronics are designed such that they calculate the temperature in the region of the stator windings on the basis of the temperature detected by the temperature sensor taking into account a specific stator temperature profile stored in a memory. Furthermore, the invention relates to a brushless, electronically commutated electric motor having a stator as described above.

15 Claims, 2 Drawing Sheets

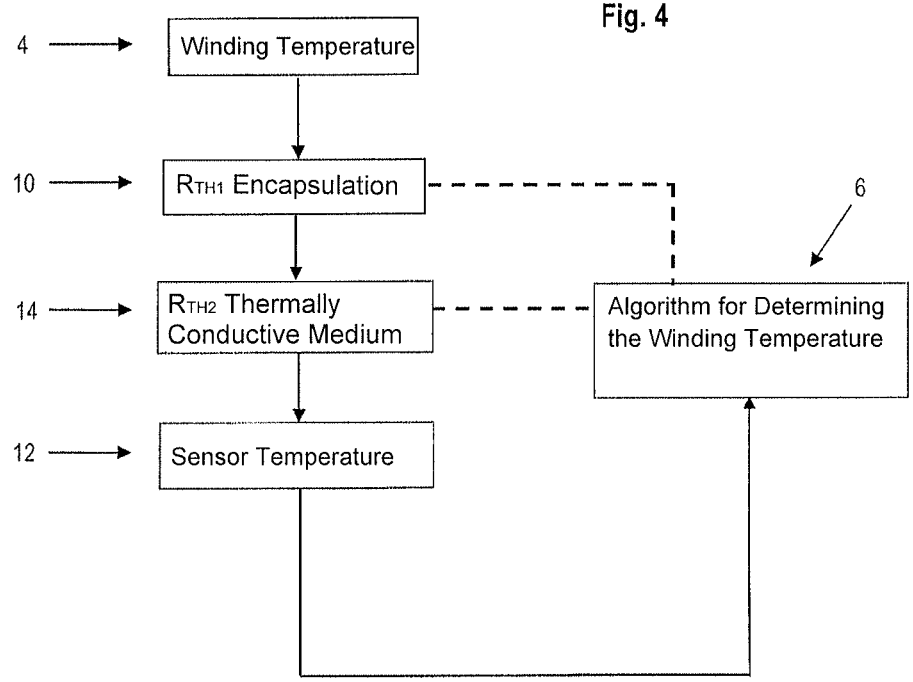

STATOR FOR AN EC-MOTOR AND EC-MOTOR WITH SUCH A STATOR

BACKGROUND

1. Field of the Invention

The present invention relates to a stator for a brushless, electronically commutated electric motor having a ferromagnetic stator core wound with stator windings and control electronics for controlling the stator windings. The invention further also relates to a brushless electric motor having a rotor as well as a stator of the kind mentioned above.

2. Related Technology

Such electric DC motors, also frequently called EC motors (EC=electronically commutated) or BLDC motors (BLDC—brushless direct current), in practice have to be provided with a protection against excess temperature. For this purpose, it has been known to place so-called thermal protectors, i.e. temperature-dependent switching elements, e.g. PTC elements, directly on the stator in the region of the stator windings, and frequently also inside the stator slots that accommodate the windings. This results in a complex manufacturing and assembly process because, as a general rule, several, in fact at least three, thermal protectors or sensors are required, which have to be mounted and electrically connected separately, namely before the stator core with the windings encapsulated in a plastic material, in particular, injection-molded.

It is the underlying object of the present invention to provide a generic stator which has a simplified design and thus can be manufactured in a simplified and more cost-effective manner

SUMMARY

According to the present invention, it is thus provided that the stator core, together with the stator windings, is fully enclosed in a molded encapsulation made of a plastic material of a defined, known thermal conductivity, at least one temperature sensor being arranged outside on the encapsulation, and the control electronics being designed such that they calculate the temperature in the region of the stator windings detected by means of the temperature sensor, taking into consideration a specific stator temperature profile stored in a memory. This embodiment, according to the present invention, considerably simplifies the manufacturing process because the complex assembly of temperature sensors before forming, in particular injection-molding the encapsulation, can completely be omitted. The temperature sensor can instead advantageously be arranged on a printed circuit board, in particular according to the SMD method (SMD=surface mounted device), and the printed circuit board only needs to be connected to the stator for the temperature sensor to be in a thermally conductive contact with the encapsulation. It can basically be a direct contact, but in also an indirect contact via a thermally conductive medium, this thermally conductive medium having a likewise defined, known thermal conductivity. The stator-specific temperature profile is previously stored in the control electronics, said temperature profile having, for example, originally been calculated empirically from all thermal conductivities between the windings of the stator and the temperature sensor and taking into account the resulting thermal transfer resistances, such that the control electronics can deduce the actual temperature of the windings by means of the temperature detected by the temperature sensor. If this calculated temperature reaches or exceeds the critical value of the winding temperature of approx. 130° C., the control electronics turn the winding current off.

As the detection of the temperature is relatively slow, the control electronics are advantageously provided with an accessory electronic error control.

BRIEF DESCRIPTION OF THE DRAWINGS

The invention will be further explained below by way of example with reference to the drawings, in which:

FIG. 4 is an explanatory diagram of the temperature detection according to the present invention.

DETAILED DESCRIPTION

Figure 1:
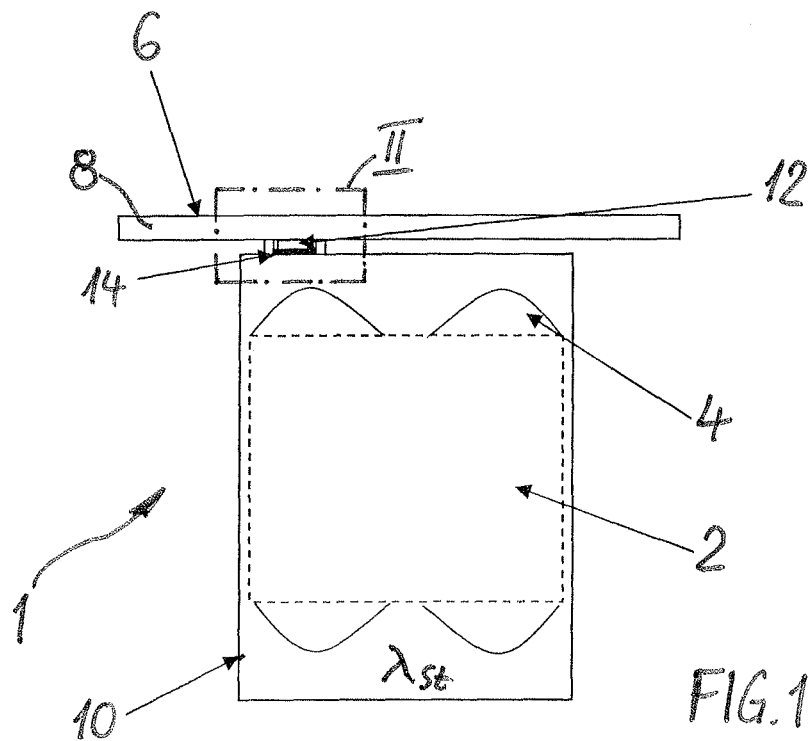
FIG. 1 illustrates a highly schematic lateral view of a stator according to the present invention.

Throughout this specification, identical parts are always provided with the same reference numerals in the different drawings and the description.

With regard to the description below, it is expressly indicated that all described individual characteristics can be used with one another in any combination, namely independently of the characteristics of the respective independent claim as well as independently of the references to the dependent claims. In addition, characteristics that are only identifiable in the drawing, without a separate description, can be fundamentally relevant to the present invention, namely as such or in any combination with at least another characteristic.

FIG. 1 is a highly simplified and schematic drawing of a stator 1. Accordingly, the stator 1 consists of a ferromagnetic stator core 2 indicated by dotted lines, which is wound with the stator windings 4. In order to electrically control the stator windings 4, in particular also for commutation purposes, the stator 1 also has control electronics 6, which are not shown in detail in the drawings; only a printed circuit board 8 is visible, on which the control electronics 6 and/or their components are at least in part arranged. The stator core 2 together with the stator windings 4 is fully enclosed in a molded encapsulation 10 made of a plastic material. This encapsulation 10 is artificially shown as transparent in FIG. 1 so that the stator core 2 with the stator windings 4 can be seen. The encapsulation 10 is preferably formed in a mold.

In other respects, the stator 1 has a customary configuration in order to pivot-mount a rotor that is not shown, which is preferably configured as an external rotor enclosing the stator 1.

According to the present invention, at least one temperature sensor 12 is now arranged outside at the encapsulation 10. In this context, the control electronics 6 according to the present invention are designed such that they calculate the temperature in the region of the stator windings 4 by means of the temperature detected by the temperature sensor 12, taking into account a specific stator temperature profile stored in a memory.

In a preferred embodiment, the temperature sensor 12 is arranged on the printed circuit board 8—in particular as an SMD component—the printed circuit board being connected to the stator 1 such that the temperature sensor 12 is in thermally conductive contact with the encapsulation 10. It can basically be a direct thermally conductive contact. In the illustrated, preferred embodiment it is, however provided, that the temperature sensor 12 is in indirect contact with the encapsulation 10 via a thermally conductive medium 14.

It is essential for the stored, specific temperature profile that the material of the encapsulation 10 has a defined and known specific thermal conductivity $\lambda_{St}$. The thermally conductive medium 14 also has a defined, known specific thermal conductivity $\lambda_M$. Thermal resistances respectively result from these thermal conductivities which are active between the stator windings 4 and the temperature sensor 12.

In this regard, reference is made here to the diagram in FIG. 4. On the one hand, the thermal resistance $R_{Th1}$ of the encapsulation 10 resulting from the thermal conductivity $\lambda_{St}$ as well as, on the other hand, the thermal resistance $R_{Th2}$ resulting from the thermal conductivity $\lambda_M$ of the thermally conductive medium 14 are active between the stator windings 4 and the actual winding temperature that exists there and the temperature sensor 12. The temperature sensor 12 consequently detects a temperature which is lower than the actual temperature of the winding. The control electronics 6 calculates the actual temperature of the winding on the basis of the temperature detected by the temperature sensor 12.

Figure 2:
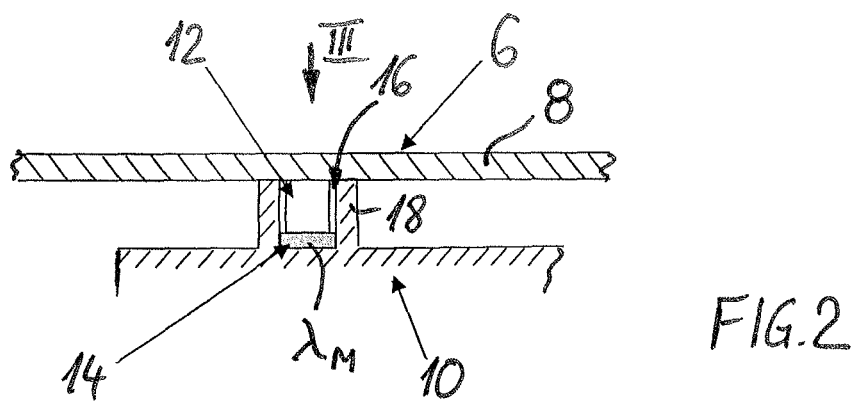
FIG. 2 is an enlarged detail of section II in FIG. 1.
Figure 3:
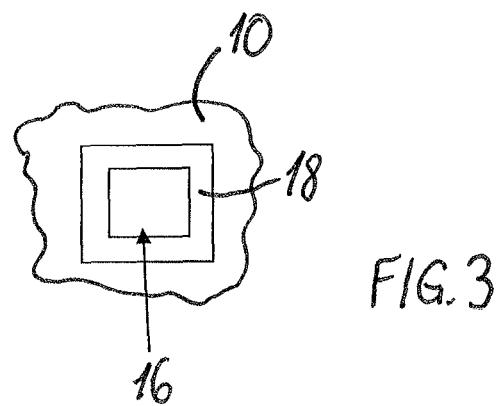
FIG. 3 is a top view in the direction of the arrow III seen in FIG. 2 without the printed circuit board.

As is further apparent from FIGS. 1 to 3, the temperature sensor 12 is preferentially arranged in a molded, pocket-like support 16 of the encapsulation 10 such that it is shielded from the ambient temperature. According to FIGS. 2 and 3, the support 16 is enclosed by a peripheral, preferably rectangular according to a top view, web wall 18 and only open in the direction of the printed circuit board 8 for the engagement of the temperature sensor 12. In the mounted position according to FIG. 2, the printed circuit board 8 comes into direct contact with the web wall 18 so that the temperature sensor 12 is completely enclosed.

The specific thermal conductivity $\lambda_{St}$ of the material of the encapsulation 10 is at least 0.4 W/m K. The higher the thermal conductivity, the more accurate the determination of the temperature is.

The thermally conductive medium 12 is at least air with a specific thermal conductivity $\lambda M$ of 0.026 W/m·K. A material with a higher thermal conductivity $\lambda_M$ can, however, be used.

It is only essential that the thermal conductivities are known in order to take the resulting temperature profile into account and store it in the control electronics 6.

The control electronics have a turn-off device to turn the stator windings 4 off when a temperature threshold value is reached or exceeded. Due to a certain inertia of the temperature detection method according to the present invention, the control electronics 6 advantageously contain an accessory electronic error control. This can be a so-called "protective device" in the sense of EN 60335-1 or UL 60730 with at least one microcontroller.

The invention is not limited to the illustrated and described exemplary embodiments but also comprises all embodiments that produce the same effects in the sense of the invention. It is expressly stated that the exemplary embodiments are not limited to all combined characteristics; on the contrary each partial characteristic can also be inventively important as such, independently of all other partial characteristics. Furthermore, the invention has not even been restricted to the combination of characteristics defined in the respective independent claim, but can also be defined by any other combination of distinctive characteristics of all disclosed individual characteristics. This means that basically each individual characteristic of the respective independent claim may be omitted and/or replaced by at least one individual characteristic disclosed at another point in the application. To this extent, the claims are to be understood merely as a first attempt at formulating the invention.

We claim:

1. A stator for a brushless, electronically commutated electric motor comprising a stator core wound with stator windings and control electronics to control the stator windings, the stator core together with the stator windings being enclosed in a molded encapsulation made of a plastic material of a defined thermal conductivity ($\lambda_{St}$), a temperature sensor being arranged outside at the encapsulation, and the control electronics being configured to calculate the temperature in the region of the stator windings on the basis of the temperature detected by the temperature sensor taking into account a specific, empirically determined temperature profile of the stator stored in a memory, the temperature profile taking into account at least the thermal conductivity $\lambda_{St}$ and thermal resistance $R_{Th1}$ of the molded encapsulation.

2. The stator according to claim 1, wherein the temperature sensor is arranged on a printed circuit board, the printed circuit board being connected to the stator such that the temperature sensor is in direct thermally conductive contact with the encapsulation.

3. A stator according to claim 1, wherein the temperature sensor is preferentially arranged in a molded, pocket-like support of the encapsulation such that it is shielded from the ambient temperature.

4. A stator according to claim 1, wherein the thermal conductivity ($\lambda_{St}$) of the material of the encapsulation (10) is at least 0.4 W/m·K.

5. The stator according to claim 1, wherein the temperature sensor is arranged on a printed circuit board, the printed circuit board being connected to the stator such that the temperature sensor is in indirect thermally conductive contact with the encapsulation via a thermally conductive medium of a defined thermal conductivity ($\lambda_M$).

6. A stator according to claim 5, wherein the thermally conductive medium is at least air having a thermal conductivity ($\lambda_M$) of 0.026 W/m·K or a material of a higher thermal conductivity ($\lambda_M$).

7. A stator according to claim 5, wherein the temperature sensor is arranged in a molded, pocket-like support of the encapsulation such that it is shielded from the ambient temperature.

8. A stator according to claim 1, wherein the control electronics are at least in part arranged together with the temperature sensor on the same printed circuit board.

9. A stator according to claim 1, wherein the control electronics have a turn-off device to turn the stator windings off when a temperature threshold value is at least reached.

10. A stator according to claim 1, wherein the control electronics have an accessory electronic error control.

11. A stator according to claim 1, wherein the stator is incorporated into a brushless, electronically commutated electric motor having a rotor.

12. The stator according to claim 1, wherein the temperature sensor is an SMD component.

13. The stator according to claim 1, wherein the stator is incorporated into a brushless, electronically commutated electric motor having an external rotor enclosing the stator.

14. The stator according to claim 1, wherein the molded encapsulation is in direct contact with the stator windings.

15. The stator according to claim 1, wherein the temperature profile additionally takes into account a thermal conductivity $\lambda_M$ of a thermally conductive medium located between the sensor and the encapsulation and its thermal resistance $R_{Th2}$.

* * * * *